(12) United States Patent
Rane et al.

(10) Patent No.: US 6,472,620 B2
(45) Date of Patent: *Oct. 29, 2002

(54) LOCKING ARRANGEMENT FOR CIRCUIT BREAKER DRAW-OUT MECHANISM

(75) Inventors: Mahesh Jaywant Rane, Bangalore (IN); Pavan Ramachandra Vitthal Kashyap, Bangalore (IN); Anilkumar Dinker Pandit, Bangalore (IN); Janakiraman Narayanan, Hosur (IN); Patrick Letient, Saint-Quentin (FR)

(73) Assignee: GE Power Controls France SAS (FR)

( * ) Notice: Subject to any disclaimer, the term of this patent is extended or adjusted under 35 U.S.C. 154(b) by 36 days.

This patent is subject to a terminal disclaimer.

(21) Appl. No.: 09/732,263

(22) Filed: Dec. 7, 2000

(65) Prior Publication Data

US 2001/0022262 A1 Sep. 20, 2001

Related U.S. Application Data

(63) Continuation-in-part of application No. 09/732,412, filed on Dec. 7, 2000
(60) Provisional application No. 60/190,643, filed on Mar. 20, 2000.

(30) Foreign Application Priority Data

Mar. 17, 2000 (FR) .............................................. 00 03485

(51) Int. Cl.[7] .............................................. H02B 11/00
(52) U.S. Cl. ..................................... 200/50.26; 200/308
(58) Field of Search ................ 200/50.01, 50.21–50.26, 200/308; 361/605–615

(56) References Cited

U.S. PATENT DOCUMENTS

| 2,340,682 A | 2/1944 | Powell ........................ 200/147 |
| 2,719,203 A | 9/1955 | Gelzheiser et al. .......... 200/144 |
| 2,937,254 A | 5/1960 | Ericson ....................... 200/114 |
| 3,158,717 A | 11/1964 | Jencks et al. ................ 200/116 |

(List continued on next page.)

FOREIGN PATENT DOCUMENTS

| BE | 819 008 A | 12/1974 |
| BE | 897 691 A | 1/1984 |
| DE | 12 27 978 | 11/1966 |
| DE | 30 47 360 | 6/1982 |
| DE | 38 02 184 | 8/1989 |

(List continued on next page.)

*Primary Examiner*—Michael Friedhofer
(74) *Attorney, Agent, or Firm*—Cantor Colburn LLP

(57) ABSTRACT

A locking arrangement for use on a draw-out mechanism mounted on a circuit breaker within a switchgear cabinet includes a fixed side plate arranged for mounting within switchgear cabinet, a mobile side plate includes a pin extending threrefrom, the mobile side plate arranged to move the circuit breaker in cooperation therewith and an obstructor plate pivotally mounted to the fixed sideplate, the obstructor plate having a slot and a notch extending from the slot, the pin traversing the slot to allow the mobile side plate to move relative to the fixed side plate.

36 Claims, 13 Drawing Sheets

U.S. PATENT DOCUMENTS

| | | |
|---|---|---|
| 3,162,739 A | 12/1964 | Klein et al. .................. 200/88 |
| 3,197,582 A | 7/1965 | Norden ........................ 200/50 |
| 3,307,002 A | 2/1967 | Cooper ...................... 200/116 |
| 3,517,356 A | 6/1970 | Hanafusa .................... 335/16 |
| 3,631,369 A | 12/1971 | Menocal .................... 337/110 |
| 3,803,455 A | 4/1974 | Willard .................. 317/33 SC |
| 3,883,781 A | 5/1975 | Cotton .................... 317/14 R |
| 4,129,762 A | 12/1978 | Bruchet ................. 200/153 G |
| 4,144,513 A | 3/1979 | Shafer et al. ................. 335/46 |
| 4,158,119 A | 6/1979 | Krakik ...................... 200/240 |
| 4,165,453 A | 8/1979 | Hennemann ........... 200/153 G |
| 4,166,988 A | 9/1979 | Ciarcia et al. ................. 335/9 |
| 4,220,934 A | 9/1980 | Wafer et al. .................. 335/16 |
| 4,255,732 A | 3/1981 | Wafer et al. .................. 335/16 |
| 4,259,651 A | 3/1981 | Yamat ....................... 335/16 |
| 4,263,492 A | 4/1981 | Maier et al. ................ 200/288 |
| 4,276,527 A | 6/1981 | Gerbert-Gaillard et al. ... 335/39 |
| 4,297,663 A | 10/1981 | Seymour et al. ............. 335/20 |
| 4,301,342 A | 11/1981 | Castonguay et al. .. 200/153 SC |
| 4,360,852 A | 11/1982 | Gilmore ...................... 361/98 |
| 4,368,444 A | 1/1983 | Preuss et al. ............... 335/166 |
| 4,375,021 A | 2/1983 | Pardini et al. .......... 200/147 B |
| 4,375,022 A | 2/1983 | Daussin et al. ......... 200/148 R |
| 4,376,270 A | 3/1983 | Staffen ....................... 335/21 |
| 4,383,146 A | 5/1983 | Bur .......................... 200/17 R |
| 4,392,036 A | 7/1983 | Troebel et al. .............. 200/322 |
| 4,393,283 A | 7/1983 | Masuda .................. 200/51.09 |
| 4,401,872 A | 8/1983 | Boichot-Castagne et al. ....... 200/153 G |
| 4,409,573 A | 10/1983 | DiMarco et al. ............. 335/16 |
| 4,435,690 A | 3/1984 | Link et al. .................... 335/37 |
| 4,467,297 A | 8/1984 | Boichot-Castagne et al. .. 335/8 |
| 4,468,645 A | 8/1984 | Gerbert-Gaillard et al. ... 335/42 |
| 4,470,027 A | 9/1984 | Link et al. .................... 335/16 |
| 4,479,143 A | 10/1984 | Watanabe et al. ............. 358/44 |
| 4,488,133 A | 12/1984 | McClellan et al. ........... 335/16 |
| 4,492,941 A | 1/1985 | Nagel .......................... 335/13 |
| 4,541,032 A | 9/1985 | Schwab ...................... 361/331 |
| 4,546,224 A | 10/1985 | Mostosi .................. 200/153 G |
| 4,550,360 A | 10/1985 | Dougherty ................... 361/93 |
| 4,562,419 A | 12/1985 | Preuss et al. ............... 335/195 |
| 4,589,052 A | 5/1986 | Dougherty ................... 361/94 |
| 4,595,812 A | 6/1986 | Tamaru et al. .............. 200/307 |
| 4,611,187 A | 9/1986 | Banfi ........................... 335/16 |
| 4,612,430 A | 9/1986 | Sloan et al. ................. 200/327 |
| 4,616,198 A | 10/1986 | Pardini ....................... 335/16 |
| 4,622,444 A | 11/1986 | Kandatsu et al. ........... 200/303 |
| 4,631,625 A | 12/1986 | Alexander et al. ............ 361/94 |
| 4,642,431 A | 2/1987 | Tedesco et al. ......... 200/153 G |
| 4,644,438 A | 2/1987 | Puccinelli et al. ............. 361/75 |
| 4,649,247 A | 3/1987 | Preuss et al. ............... 200/244 |
| 4,658,322 A | 4/1987 | Rivera ........................ 361/37 |
| 4,672,501 A | 6/1987 | Bilac et al. ................... 361/96 |
| 4,675,481 A | 6/1987 | Markowski et al. .... 200/144 R |
| 4,682,264 A | 7/1987 | Demeyer ..................... 361/96 |
| 4,689,712 A | 8/1987 | Demeyer ..................... 361/96 |
| 4,694,373 A | 9/1987 | Demeyer ..................... 361/96 |
| 4,710,845 A | 12/1987 | Demeyer ..................... 361/96 |
| 4,717,985 A | 1/1988 | Demeyer ..................... 361/96 |
| 4,733,211 A | 3/1988 | Castonguay et al. ........ 335/192 |
| 4,733,321 A | 3/1988 | Lindeperg .................... 361/96 |
| 4,743,715 A | 5/1988 | Gaillard et al. ......... 200/50 AA |
| 4,764,650 A | 8/1988 | Bur et al. ................. 200/153 G |
| 4,768,007 A | 8/1988 | Mertz et al. ................ 335/202 |
| 4,780,786 A | 10/1988 | Weynachter et al. .......... 361/87 |
| 4,831,221 A | 5/1989 | Yu et al. .................... 200/553 |
| 4,870,531 A | 9/1989 | Danek ........................ 361/93 |
| 4,883,931 A | 11/1989 | Batteux et al. ......... 200/148 R |
| 4,884,047 A | 11/1989 | Baginski et al. ............. 335/10 |
| 4,884,164 A | 11/1989 | Dziura et al. ................. 361/97 |
| 4,900,882 A | 2/1990 | Bernard et al. ......... 200/147 R |
| 4,910,485 A | 3/1990 | Bolongeat-Mobleu et al. ............. 335/195 |
| 4,914,541 A | 4/1990 | Tripodi et al. ................. 361/94 |
| 4,916,420 A | 4/1990 | Bartolo et al. .............. 335/172 |
| 4,916,421 A | 4/1990 | Pardini et al. .............. 335/185 |
| 4,926,282 A | 5/1990 | McGhie ..................... 361/102 |
| 4,935,590 A | 6/1990 | Malkin et al. .......... 200/148 A |
| 4,937,706 A | 6/1990 | Schueller et al. ........... 361/396 |
| 4,939,492 A | 7/1990 | Raso et al. ................... 335/42 |
| 4,943,691 A | 7/1990 | Mertz et al. ................ 200/151 |
| 4,943,888 A | 7/1990 | Jacob et al. .................. 361/96 |
| 4,950,855 A | 8/1990 | Bolonegeat-Mobleu et al. ......... 200/148 A |
| 4,951,019 A | 8/1990 | Gula ......................... 335/166 |
| 4,952,897 A | 8/1990 | Barnel et al. ............... 335/147 |
| 4,958,135 A | 9/1990 | Baginski et al. ............... 335/8 |
| 4,965,543 A | 10/1990 | Batteux ..................... 335/174 |
| 4,983,788 A | 1/1991 | Pardini ..................... 200/16 R |
| 5,001,313 A | 3/1991 | Leclerq et al. .......... 200/148 B |
| 5,004,878 A | 4/1991 | Seymour et al. ........ 200/144 R |
| 5,029,301 A | 7/1991 | Nebon et al. ................. 335/16 |
| 5,030,804 A | 7/1991 | Abri .......................... 200/323 |
| 5,057,655 A | 10/1991 | Kersusan et al. ....... 200/148 B |
| 5,077,627 A | 12/1991 | Fraisse ...................... 361/93 |
| 5,083,081 A | 1/1992 | Barrault et al. ............. 324/126 |
| 5,095,183 A | 3/1992 | Raphard et al. ........ 200/148 A |
| 5,103,198 A | 4/1992 | Morel et al. .................... 335/6 |
| 5,115,371 A | 5/1992 | Tripodi ...................... 361/106 |
| 5,120,921 A | 6/1992 | DiMarco et al. ............ 200/401 |
| 5,132,865 A | 7/1992 | Mertz et al. ................... 361/6 |
| 5,138,121 A | 8/1992 | Streich et al. .............. 200/293 |
| 5,140,115 A | 8/1992 | Morris ....................... 200/308 |
| 5,153,802 A | 10/1992 | Mertz et al. .................. 361/18 |
| 5,155,315 A | 10/1992 | Malkin et al. .......... 200/148 R |
| 5,166,483 A | 11/1992 | Kersusan et al. ....... 200/144 A |
| 5,172,087 A | 12/1992 | Castoguay et al. ......... 335/160 |
| 5,178,504 A | 1/1993 | Falchi ........................ 411/553 |
| 5,184,717 A | 2/1993 | Chou et al. ................. 200/401 |
| 5,187,339 A | 2/1993 | Lissandrin .............. 200/148 F |
| 5,198,956 A | 3/1993 | Dvorak ...................... 361/106 |
| 5,200,724 A | 4/1993 | Gula et al. .................. 335/166 |
| 5,210,385 A | 5/1993 | Morel et al. ............. 200/146 R |
| 5,239,150 A | 8/1993 | Bolongeat-Mobleu et al. ......... 200/148 R |
| 5,260,533 A | 11/1993 | Livesey et al. ............. 200/401 |
| 5,262,744 A | 11/1993 | Arnold et al. .................. 335/8 |
| 5,280,144 A | 1/1994 | Bolongeat-obleu et al. ............. 200/148 R |
| 5,281,776 A | 1/1994 | Morel et al. ................ 200/144 |
| 5,296,660 A | 3/1994 | Morel et al. ............. 200/146 R |
| 5,296,664 A | 3/1994 | Crookston et al. .......... 200/401 |
| 5,298,874 A | 3/1994 | Morel et al. .................... 335/8 |
| 5,300,907 A | 4/1994 | Nereau et al. .............. 335/172 |
| 5,310,971 A | 5/1994 | Vial et al. ................... 200/244 |
| 5,313,180 A | 5/1994 | Vial et al. ..................... 335/16 |
| 5,317,471 A | 5/1994 | Izoard et al. ................ 361/105 |
| 5,331,500 A | 7/1994 | Corcoles et al. .............. 361/93 |
| 5,334,808 A | 8/1994 | Bur et al. ..................... 200/50 |
| 5,341,191 A | 8/1994 | Crookston et al. ............ 335/16 |
| 5,347,096 A | 9/1994 | Bolongeat-obleu et al. ............. 200/148 B |
| 5,347,097 A | 9/1994 | Bolongeat-Mobleu et al. ......... 200/148 B |
| 5,350,892 A | 9/1994 | Rozier .................... 200/144 B |
| 5,357,066 A | 10/1994 | Morel et al. ............... 200/17 R |
| 5,357,068 A | 10/1994 | Rozier ..................... 20/145 R |
| 5,357,394 A | 10/1994 | Piney .......................... 361/72 |
| 5,361,052 A | 11/1994 | Ferullo et al. .............. 335/172 |
| 5,373,130 A | 12/1994 | Barrault et al. ......... 200/147 R |
| 5,379,013 A | 1/1995 | Coudert ....................... 335/17 |

| | | | | | | |
|---|---|---|---|---|---|---|
| 5,424,701 A | 6/1995 | Castonguary et al. ........ 335/172 | EP | 0 174 904 | 3/1986 |
| 5,438,176 A | 8/1995 | Bonnardel et al. .......... 200/400 | EP | 0 196 241 | 10/1986 |
| 5,440,088 A | 8/1995 | Coudert et al. ............. 200/303 | EP | 0 224 396 | 6/1987 |
| 5,449,871 A | 9/1995 | Batteux et al. ............. 200/401 | EP | 0 235 479 | 9/1987 |
| 5,450,048 A | 9/1995 | Leger et al. ................ 335/132 | EP | 0 239 460 | 9/1987 |
| 5,451,729 A | 9/1995 | Onderka et al. ............. 200/18 | EP | 0 258 090 | 3/1988 |
| 5,457,295 A | 10/1995 | Tanibe et al. ............... 200/293 | EP | 0 264 313 | 4/1988 |
| 5,467,069 A | 11/1995 | Payet-Burin et al. ......... 335/42 | EP | 0 264 314 | 4/1988 |
| 5,469,121 A | 11/1995 | Payet-Burin ................ 335/16 | EP | 0 283 189 | 9/1988 |
| 5,475,558 A | 12/1995 | Barjonnet et al. ............ 361/64 | EP | 0 283 358 | 9/1988 |
| 5,477,016 A | 12/1995 | Baginski et al. ........... 200/43.11 | EP | 0 291 374 | 11/1988 |
| 5,479,143 A | 12/1995 | Payet-Burin ................ 335/202 | EP | 0 295 155 | 12/1988 |
| 5,483,212 A | 1/1996 | Lankuttis et al. ........... 335/132 | EP | 0 295 158 | 12/1988 |
| 5,485,343 A | 1/1996 | Santos et al. ............... 361/115 | EP | 0 309 923 | 4/1989 |
| D367,265 S | 2/1996 | Yamagata et al. ......... D13/160 | EP | 0 313 106 | 4/1989 |
| 5,493,083 A | 2/1996 | Olivier .................... 200/17 R | EP | 0 313 422 | 4/1989 |
| 5,504,284 A | 4/1996 | Lazareth et al. .......... 200/50 R | EP | 0 314 540 | 5/1989 |
| 5,504,290 A | 4/1996 | Baginski et al. ............ 200/401 | EP | 0 331 586 | 9/1989 |
| 5,510,761 A | 4/1996 | Boder et al. ................ 335/172 | EP | 0 337 900 | 10/1989 |
| 5,512,720 A | 4/1996 | Coudert et al. ............. 200/400 | EP | 0 342 133 | 11/1989 |
| 5,515,018 A | 5/1996 | DiMarco et al. ............. 335/16 | EP | 0 367 690 | 5/1990 |
| 5,519,561 A | 5/1996 | Mrenna et al. ............. 361/105 | EP | 0 371 887 | 6/1990 |
| 5,534,674 A | 7/1996 | Steffens ...................... 218/154 | EP | 0 375 568 | 6/1990 |
| 5,534,832 A | 7/1996 | Duchemin et al. ........... 335/16 | EP | 0 394 144 | 10/1990 |
| 5,534,835 A | 7/1996 | McColloch et al. ......... 335/172 | EP | 0 394 922 | 10/1990 |
| 5,534,840 A | 7/1996 | Cuingnet ...................... 337/1 | EP | 0 399 282 | 11/1990 |
| 5,539,168 A | 7/1996 | Linzenich ................... 200/303 | EP | 0 407 310 | 1/1991 |
| 5,543,595 A | 8/1996 | Mader et al. ............... 200/401 | EP | 0 452 230 | 10/1991 |
| 5,552,755 A | 9/1996 | Fello et al. .................... 335/18 | EP | 0 555 158 | 8/1993 |
| 5,581,219 A | 12/1996 | Nozawa et al. ............. 335/132 | EP | 0 560 697 | 9/1993 |
| 5,604,656 A | 2/1997 | Derrick et al. ............. 361/187 | EP | 0 567 416 | 10/1993 |
| 5,608,367 A | 3/1997 | Zoller et al. ................ 335/132 | EP | 0 595 730 | 5/1994 |
| 5,784,233 A | 7/1998 | Bastard et al. ................ 361/36 | EP | 0 619 591 | 10/1994 |
| 5,837,949 A * | 11/1998 | Green et al. ............. 200/50.21 | EP | 0 665 569 | 8/1995 |
| 6,005,208 A * | 12/1999 | Castonguay ................ 200/308 | EP | 0 700 140 | 3/1996 |
| 6,160,228 A * | 12/2000 | Gerbert-Gaillard et al. .......... 200/50.21 | EP | 0 889 498 | 1/1999 |
| | | | FR | 2 410 353 | 6/1979 |
| 6,160,229 A * | 12/2000 | Grelier et al. ............ 200/50.26 | FR | 2 512 582 | 3/1983 |
| 6,252,186 B1 * | 6/2001 | Liebetruth et al. .......... 200/308 | FR | 2 553 943 | 4/1985 |
| 6,265,678 B1 * | 7/2001 | Robbins et al. .......... 200/50.21 | FR | 2 592 998 | 7/1987 |
| | | | FR | 2 682 531 | 4/1993 |
| | | FOREIGN PATENT DOCUMENTS | FR | 2 697 670 | 5/1994 |
| DE | 38 43 277 | 6/1990 | FR | 2 699 324 | 6/1994 |
| DE | 44 19 240 | 1/1995 | FR | 2 714 771 | 7/1995 |
| EP | 0 061 092 | 9/1982 | GB | 2 233 155 | 1/1991 |
| EP | 0 064 906 | 11/1982 | SU | 1 227 978 | 4/1986 |
| EP | 0 066 486 | 12/1982 | WO | 92/00598 | 1/1992 |
| EP | 0 076 719 | 4/1983 | WO | 92/05649 | 4/1992 |
| EP | 0 117 094 | 8/1984 | WO | 94/00901 | 1/1994 |
| EP | 0 140 761 | 5/1985 | | | |

* cited by examiner

LOCKING ARRANGEMENT FOR CIRCUIT BREAKER DRAW-OUT MECHANISM

CROSS REFERENCE TO RELATED APPLICATIONS

This application is a continuation-in-part of U.S. patent application Ser. No. 09/732,412 filed on Dec. 7, 2000, pending.

This application is based upon, and claims the benefit of, U.S. Provisional Patent Application Serial No. 60/190,643 filed on Mar. 20, 2000, which is herein incorporated by reference and Application No. 0003485 filed on Mar. 17, 2000, in France, which is herein incorporated by reference.

BACKGROUND OF THE INVENTION

This invention relates to a draw-out unit for electrical switchgear cabinets. More specifically, this invention relates to a locking arrangement for a circuit breaker draw-out unit.

The use of switchgears in electrical distribution systems is well known. The switchgear houses a plurality of draw-out units, with each draw-out unit housing one or more switching devices, such as motor controllers and circuit breakers, releasably interconnected to one or more busbars. Periodically, the draw-out units are removed from the switchgear to allow for maintenance of equipment. The switching devices within the draw-out units make electrical contact with the busbars through a plurality of clip connectors, which extend from the draw-out unit. Each clip connector is electrically connected to an electrical conductor for connection to the switching devices of the switchgear. As the draw-out unit is inserted into the switchgear, the busbar slides between the two contact arms, and the contact arms frictionally engage the busbar.

Draw-out mechanisms are known in the art for use with molded case circuit breakers. One such mechanism is described in U.S. Pat. No. 4,743,715 issued May 10, 1988. These mechanisms have discrete positions for testing, installing and removing the circuit breaker. The positions are CONNECT, DISCONNECT and TEST. In the CONNECT position the circuit breaker, can be closed, opened or tripped. In the DISCONNECT position the circuit breaker is in the trip position. The third position is TEST, wherein the circuit breaker is disconnected from the main circuit. In the TEST position the circuit breaker can be closed, opened or tripped in order to check internal and external accessories such as auxiliary switches, shunt trip and under voltage and secondary circuits.

It is frequently necessary to ensure that electrical equipment cannot be operated, for example while maintenance work is being carried out. It is essential to ensure that circuit breakers in a draw out mechanism are secured in the DISCONNECT position to avoid inadvertent operation that can lead to unplanned personnel exposure or equipment damage

BRIEF SUMMARY OF THE INVENTION

In an exemplary embodiment of the present invention, a locking arrangement for use on a draw-out mechanism mounted on a circuit breaker within a switchgear cabinet includes a fixed side plate arranged for mounting within switchgear cabinet, a mobile side plate includes a pin extending threrefrom, the mobile side plate arranged to move the circuit breaker in cooperation therewith and an obstructor plate pivotally mounted to the fixed sideplate, the obstructor plate having a slot and a notch extending from the slot, the pin traversing the slot to allow the mobile side plate to move relative to the fixed side plate.

The above discussed and other features and advantages of the present invention will be appreciated and understood by those skilled in the art from the following detailed description and drawings.

BRIEF DESCRIPTION OF THE DRAWINGS

The present invention will now be described, by way of example, with reference to the following FIGURES, in which.

DETAILED DESCRIPTION OF THE INVENTION

Figure 1:
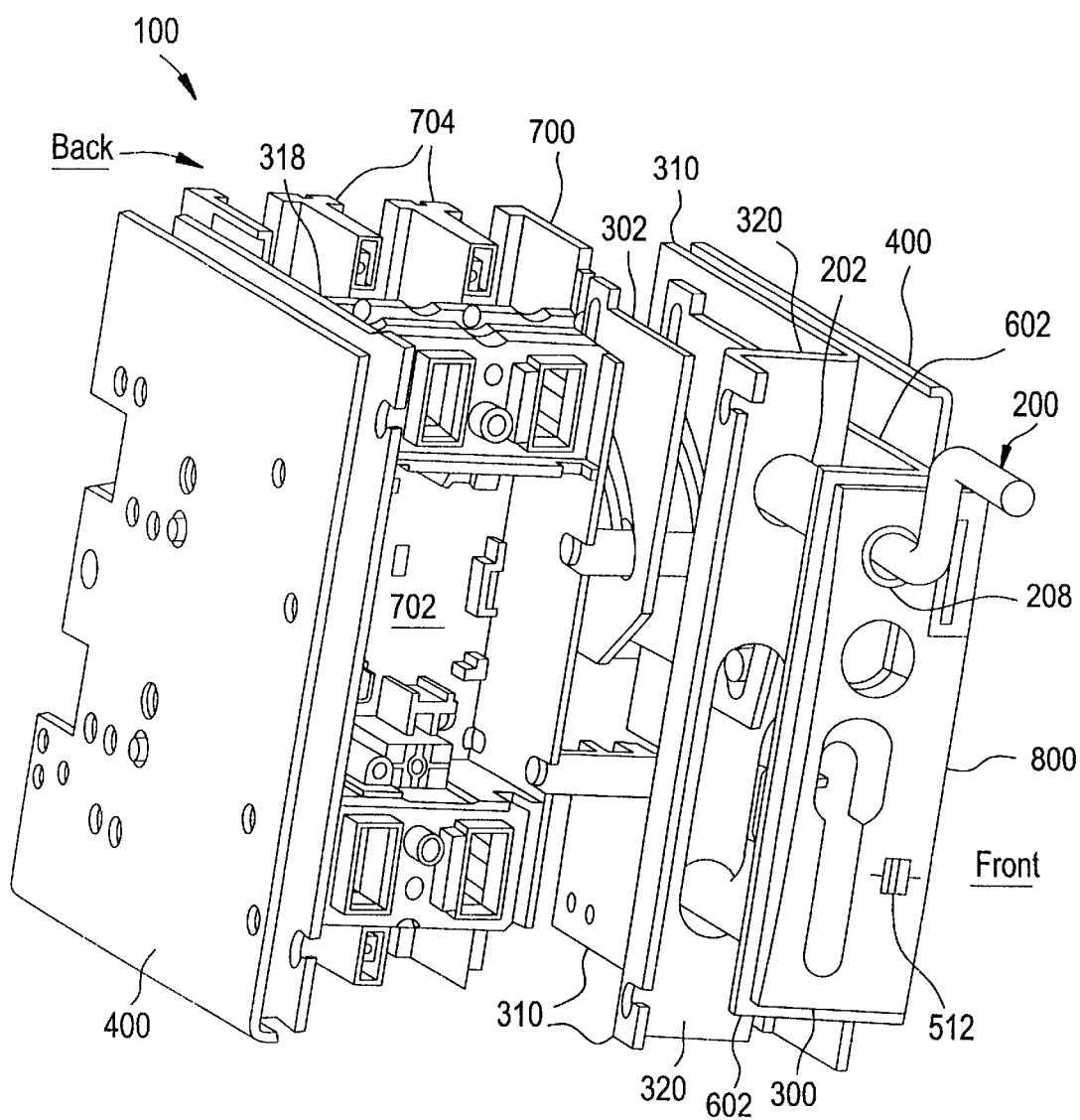
FIG. 1 is a partially exploded perspective view of the draw-out mechanism of the present invention.

Referring now to FIG. 1, the draw-out mechanism (unit) of the present invention is shown generally at 100. The draw-out mechanism 100 is generally comprised of a pair of fixed side plates 400 disposed parallel to one another. Interior to the pair of fixed side plates 400 are disposed a mobile side plate 310 and mobile side plate 318. The mobile side plate 318 comprises essentially a flat plate while the mobile side plate 310 comprises a bent plate in an essentially step like form including a front piece 320 whereby the mobile side plate 310 and the mobile side plate 318 are juxtaposed in proximity to one another. Continuing in FIG. 1, the draw-out mechanism 100 further comprises a plug-in base 700 disposed between the mobile side plate 310 and the mobile side plate 318. The plug-in base 700, the mobile side plate 310, the mobile plate 318 and the front piece 320 define an interior chamber 702 operative to accept therein a circuit breaker such as a molded case circuit breaker (MCCB, not shown). The circuit breaker (not shown) is secured to mobile side plate 318, allowing the circuit breaker to move with mobile side plate 318 in a manner described hereinafter. A cam 302 is juxtaposed between the plug-in base 700 and the mobile side plate 310. A locking slide 602 is disposed between the mobile side plate 318 and one of the fixed side plates 400. Further in FIG. 1, a screw 202 is made accessible to a crank 200 whereby the draw-out mechanism 100 may be brought to one of a plurality of positions. The draw-out mechanism 100 is connected to an electrical distribution circuit (not shown) at the clip connectors 704. An electrical socket (not shown) is fixed to base 700 within interior chamber 702 and forms a releasable connection with a plug (not shown) extending from the circuit breaker to connect the circuit breaker with the main circuit via clip connectors 704.

The aforesaid positions of the draw-out mechanism 100 are firstly that of CONNECT, wherein the circuit breaker is connected to the main electrical circuit (not shown). In the CONNECT position the circuit breaker can be closed, open or tripped. The second position is DISCONNECT, wherein the circuit breaker is disconnected (unplugged) from the main circuit. In the DISCONNECT position the circuit breaker is in the trip position and the draw-out mechanism 100 can be locked to prevent movement of the draw-out mechanism 100. The third position is TEST, wherein the circuit breaker remains disconnected (unplugged) from the main circuit. In the TEST position the circuit breaker can be closed, open or tripped in order to check internal and external accessories such as auxiliary switches, shunt trip and under voltage and secondary circuits (not shown).

Figure 2:
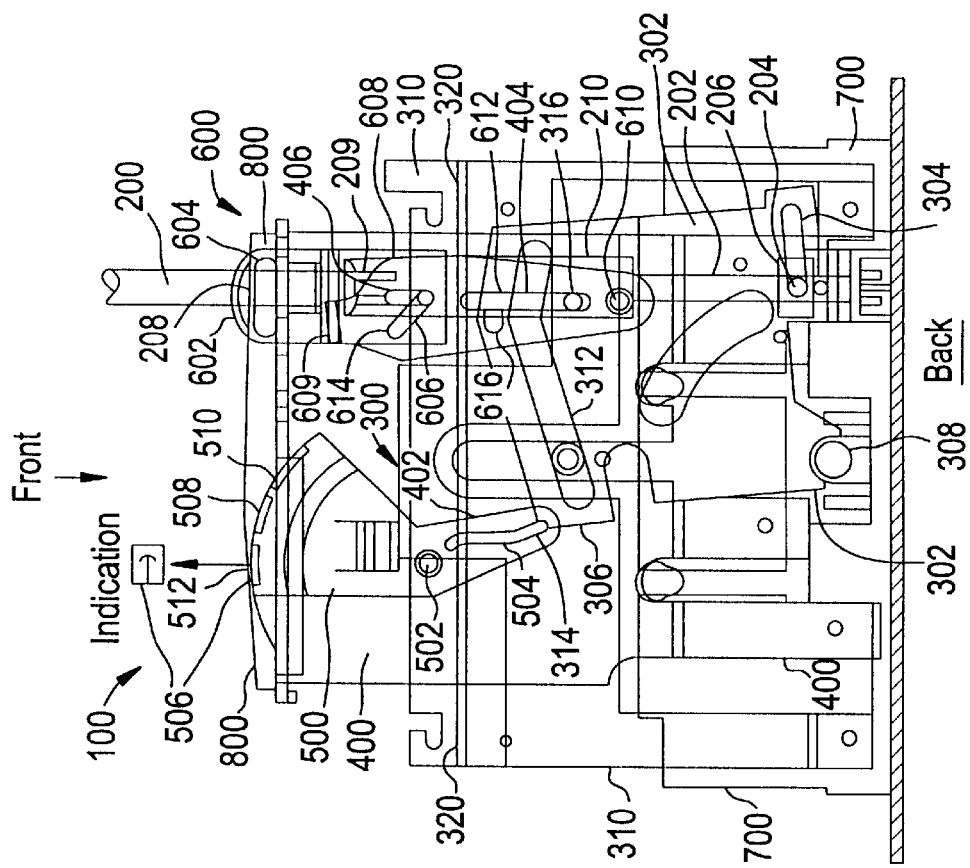
FIG. 2 is a side view of the draw-out mechanism of FIG. 1 in the CONNECT position.
Figure 3:
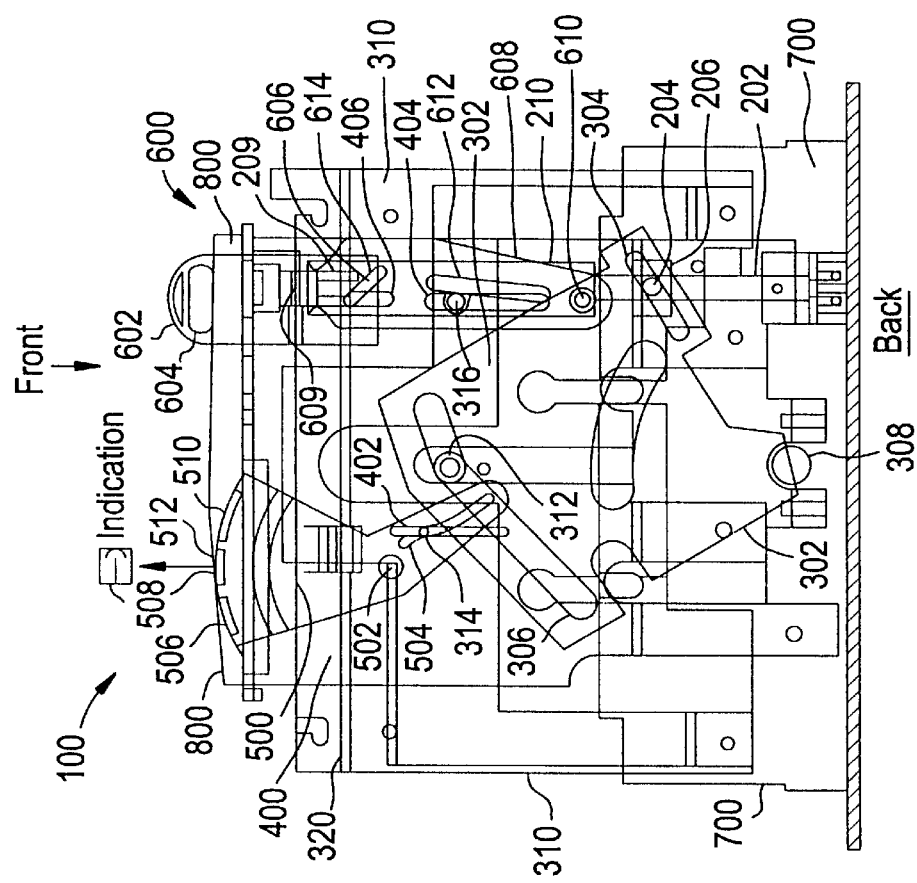
FIG. 3 is side view of the draw-out mechanism of FIG. 1 in the DISCONNECT position.
Figure 4:
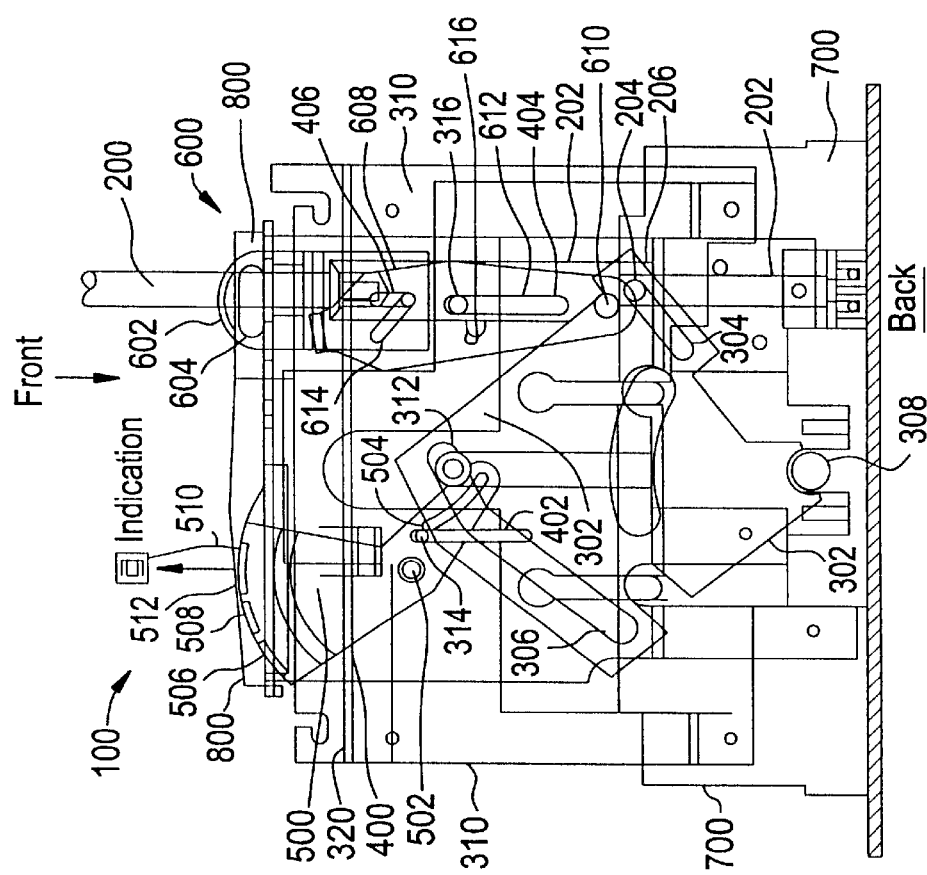
FIG. 4 is a side view of the draw-out mechanism of FIG. 1 in the TEST position.
Figure 5:
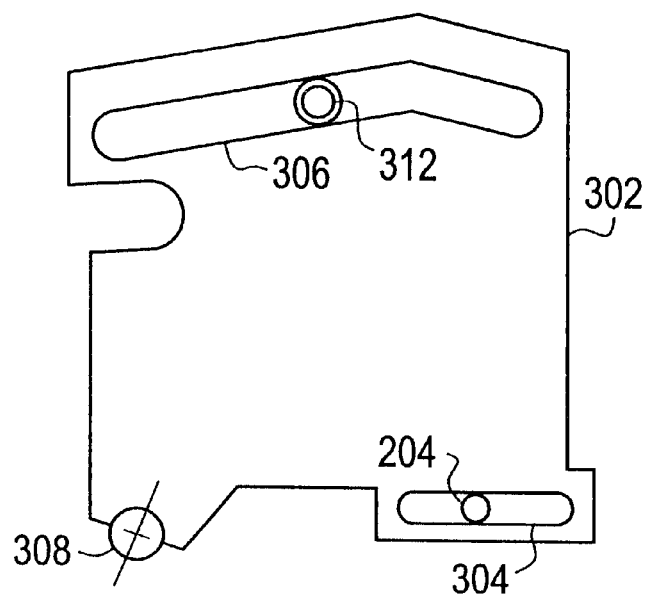
FIG. 5 is a side view of the cam of the draw-out mechanism of FIG. 1.
Figure 6:
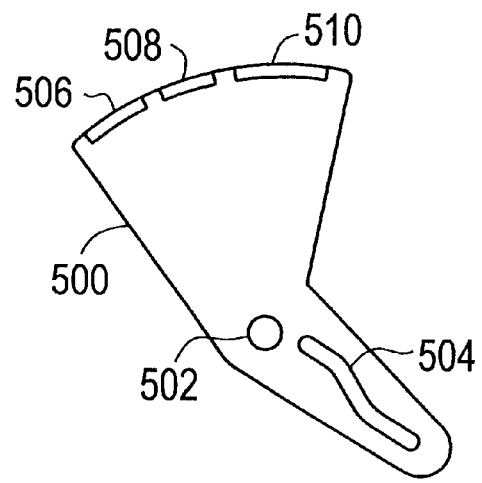
FIG. 6 is a side view of the indicator of the draw-out mechanism of FIG. 1.
Figure 7:
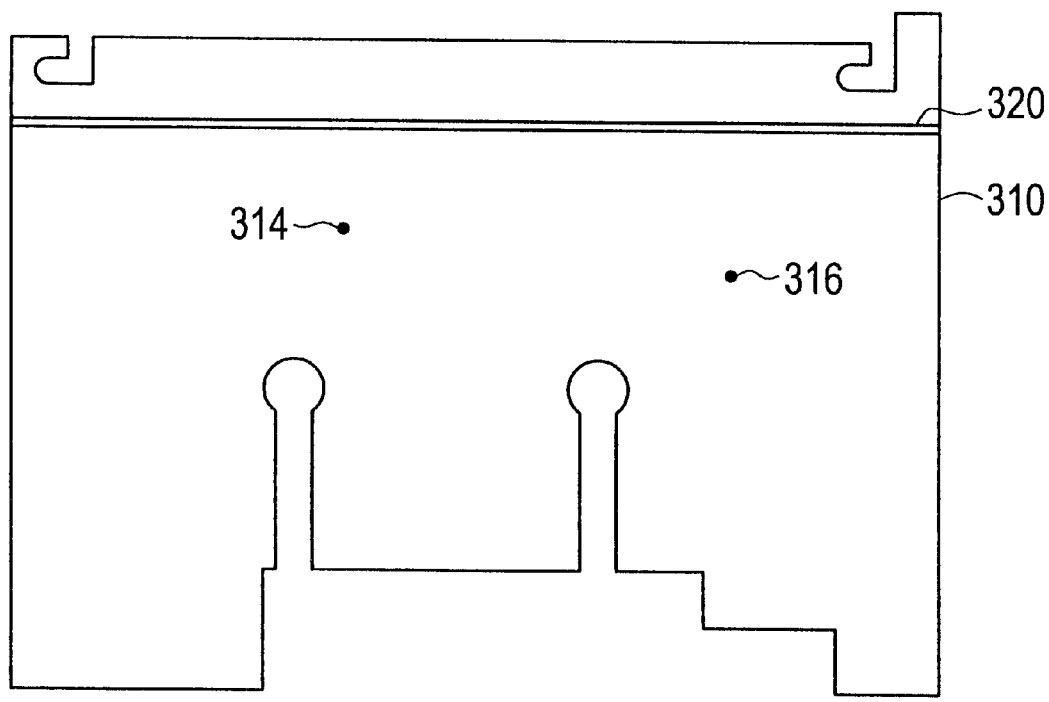
FIG. 7 is a side view of a mobile side plate of the draw-out mechanism of FIG. 1.
Figure 8:
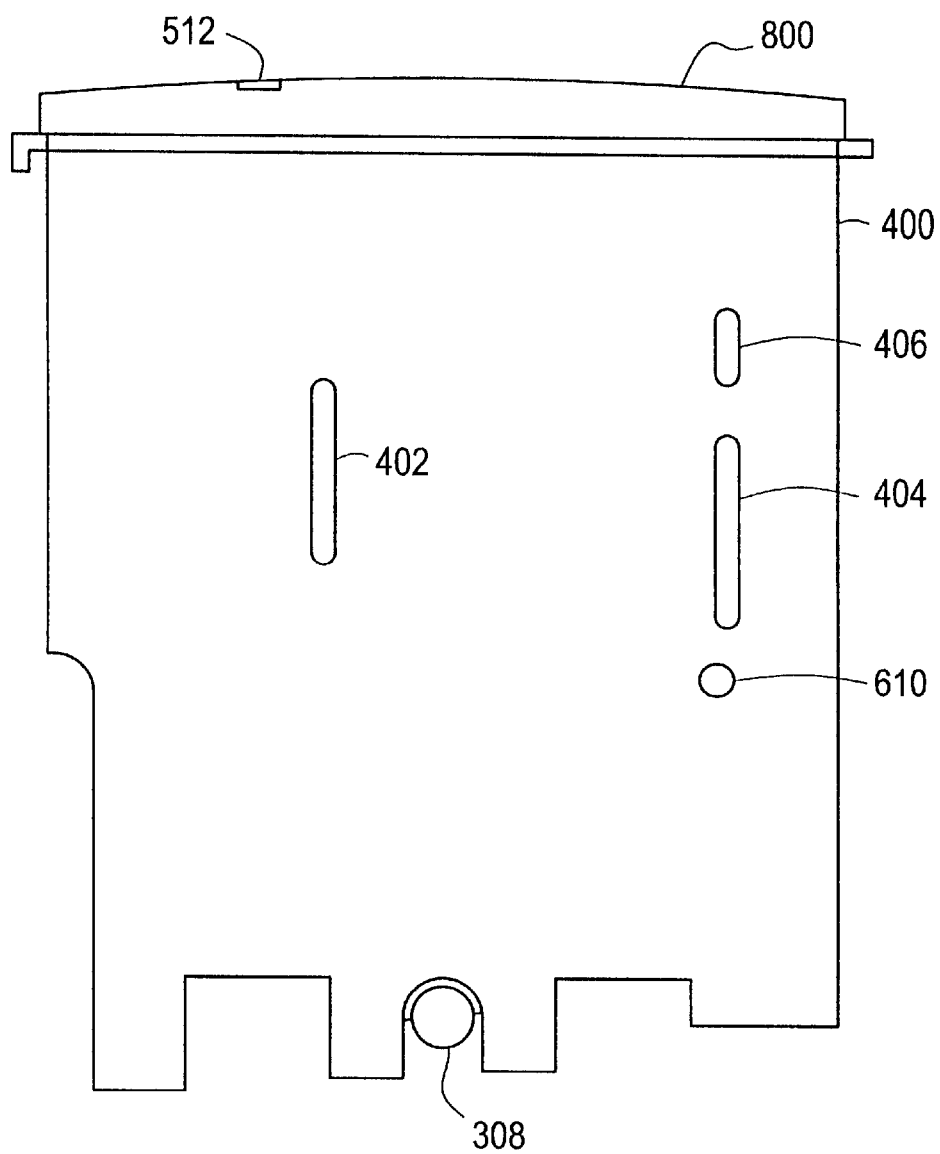
FIG. 8 is a side view of one of a pair of fixed side plates of the draw-out mechanism of FIG. 1.
Figure 9:
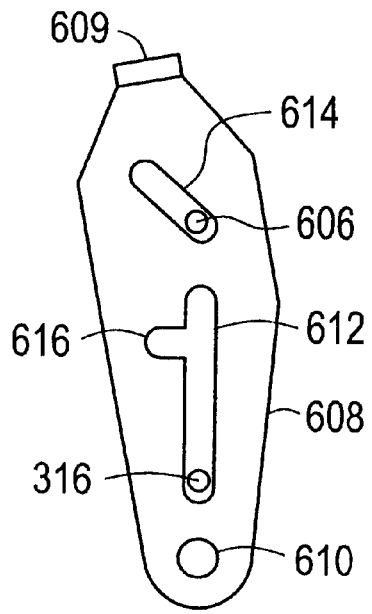
FIG. 9 is a side view of the obstructor plate of the draw-out mechanism of FIG. 1.
Figure 10:
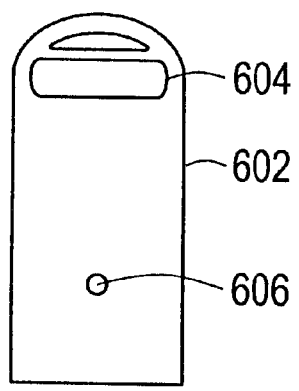
FIG. 10 is a side view of the locking slide of the draw-out mechanism of FIG. 1.

Reference will now be had to FIGS. 2, 3 and 4 of the drawing to explain the mechanical configurations assumed by the draw-out mechanism 100. In the interest of clarity, reference is also made to FIGS. 5 through 10 of the drawing. In FIG. 2, the draw-out mechanism 100 is in the CONNECT position which is indicated on the first position indicator 506 of the indicator 500 and can be viewed through the indicator port 512. A crank 200 is inserted through a crank port 208 in the command box 800 and into a socket 209 formed in a sleeve 210. Sleeve 210 is secured to a screw 202 thereby allowing crank 200 to turn the screw 202. The crank 200 and screw 202 in combination extend essentially the full depth of the draw-out mechanism 100 from front to back. At the back end of the screw 202 a threaded collar 206 is threadably engaged to the screw 202. The collar 206 includes a pin 204 affixed thereto and disposed within a slot 304 in a cam 302 of a cam system 300. The crank 200, screw 202, collar 206 and cam 302 in combination operate such that as the crank 200 rotates, the collar 206 translates along the screw 202. The movement of the pin 204 disposed in the slot 304, rotates the cam 302 counterclockwise as viewed about an axis of rotation 308 affixed to the fixed side plate 400. A pin 312 is affixed to the mobile side plate 310 and disposed within a slot 306 of the cam 302. As the cam 302 rotates about the axis of rotation 308, due to the action of the pin 204 and collar 206, the pin 312 moves within slot 306 causing mobile side plate 310 to move toward the front of the draw-out unit 100.

Continuing in FIG. 2, the mobile side plate 310 has a pin 314 affixed thereto. The indicator 500 is affixed to the fixed side plate 400 at an axis of rotation 502 and free to rotate thereabout. The indicator 500 further comprises a slot 504, which partly coincides with or overlaps a slot 402 in the fixed side plate 400. The aforesaid pin 314 is disposed in the slot 402 in the fixed side plate 400 and in the slot 504 in the indicator 500. Thus as the mobile side plate 310 moves, so moves the pin 314 along both the slot 402 and the slot 504. This motion causes the indicator 500 to rotate about the axis of rotation 502. Thus, from the CONNECT position, the rotation of the crank 200 and the screw 202 rotates the cam 302 about the axis of rotation 308 moving the mobile side plates 310, 318 from the back of the draw-out mechanism 100 toward the front thereof, and rotating the indicator 500 counterclockwise about the axis of rotation 502. The circuit breaker, which is attached to mobile side plate 318, also moves toward the front of draw-out unit 100, unplugging the circuit breaker from the main circuit. Thus, the draw-out mechanism 100 assumes the DISCONNECT 508 position of FIG. 3.

Continuing in FIG. 2, the draw-out mechanism 100 is further comprised of a locking device (arrangement) 600. The locking system 600 includes a locking slide 602 and an obstructor plate 608. In a first embodiment of the locking slide 602, locking slide 602 includes a locking hole 604 and a pin 606 affixed thereto. The obstructor plate 608 includes an axis of rotation 610 about which the obstructor plate 608 is free to rotate. The axis of rotation 610 is affixed to the fixed side plate 400. The obstructor plate 608 further includes a slot 614 and a slot 612 having a notch 616. The locking system 600 is operative such that as the mobile side plate 310 moves from back to front due to the action of the crank 200 and screw 202, a pin 316 attached to the mobile side plate 310 and disposed within the slot 612 and a slot 404 in the fixed side plate 400, moves therewith within the slots 612, 404. When the draw-out mechanism 100 has assumed the DISCONNECT position, the pin 316 is aligned with the notch 616. The crank 200 is removed from the draw-out mechanism 100 and the locking slide 602 may be manually pulled in a direction away from the draw-out mechanism 100. As such, the pin 606, disposed within an slot 406 in the fixed side plate 400, so moves and, engaged also with the slot 614, causes the obstructor plate 608 to rotate clockwise as viewed about the axis of rotation 610 until the pin 316 is captured by the notch 616. This action essentially aligns the obstructor plate 608 along with the screw 202 and a flange 609 extending from the obstructor plate 608 covers the socket 209 to prevent the crank 200 from being reinserted into the draw-out mechanism 100 in the DISCONNECT position shown in FIG. 3. The locking hole 604 is clear of the command box 800 and a lock (not shown) may be placed therein to prevent the draw-out unit 100 from being placed in the TEST or DISCONNECT positions. Because pin 316 is captured in notch 616, mobile side plate 310 is fixed in the DISCONNECT position to further insure that the draw-out unit 100 is not placed in the TEST or DISCONNECT positions. In alternative embodiments, the obstructor plate 608 extends from draw-out mechanism 100 and is pivoted about axis 610 by hand. As such, locking slide 602 is not necessary. Additionally, obstructor plate 608 may be biased in a counter-clockwise direction about axis 610 using, for example, a spring extending from the fixed side plate 400 to the obstructor plate 608. Biasing the obstructor plate 608 would pivot the obstructor plate 608 such that notch 616 captures pin 316 as soon as crank 200 is removed, provided that the draw-out mechanism 100 is in the DISCONNECT position.

Continuing in FIG. 3, in order for the draw-out mechanism 100 to proceed from the DISCONNECT position to the TEST position, the aforesaid lock is removed from the locking hole 604 and the locking slide 602 is manually pushed into the draw-out mechanism 100. Such action rotates the obstructor plate 608 counterclockwise as viewed, thereby disengaging the pin 316 from the notch 616 and allowing the crank 200 to be reinserted into the draw-out mechanism 100 to engage the socket 209. Upon further rotation of the crank 200, the screw 202 and the pin 204 continue to move to the front of the draw-out mechanism 100 and continue to rotate the cam 302 counterclockwise as viewed. As such, the slot 306 drives the pin 312, the mobile side plates 310 and 318, and the circuit breaker towards the front of the draw-out mechanism 100. In addition, pin 314 continues to move along the slot 402 and the slot 504. This in turn continues to rotate the indicator 500 counterclockwise as viewed about the axis of rotation 502 until the indicator 500 comes to rest in the TEST position of FIG. 4 viewable through the indicator port 512. The draw-out mechanism 100 may be returned to the DISCONNECT or CONNECT positions from the TEST position by reversing the aforesaid action of the crank 200 and the screw 202.

Cam 302, indicator 500, mobile and fixed side plates 310, 400 and obstructor plate 608 are substantially flat structures that can be arranged in close proximity to each other creating a compact draw-out mechanism 100. Thus, the draw-out mechanism 100 provides a compact arrangement allowing the associated circuit breaker to be placed in CONNECT, DISCONNECT and TEST positions. Because the draw-out mechanism 100 is compact, it can be used with smaller sized circuit breakers. In addition, the draw-out mechanism 100 provides position indicator and locking features within the compact arrangement. For clarity, FIGS. 5 through 10 are views of the various components of the draw-out mechanism 100 shown in FIGS. 1 through 4.

Figure 11:
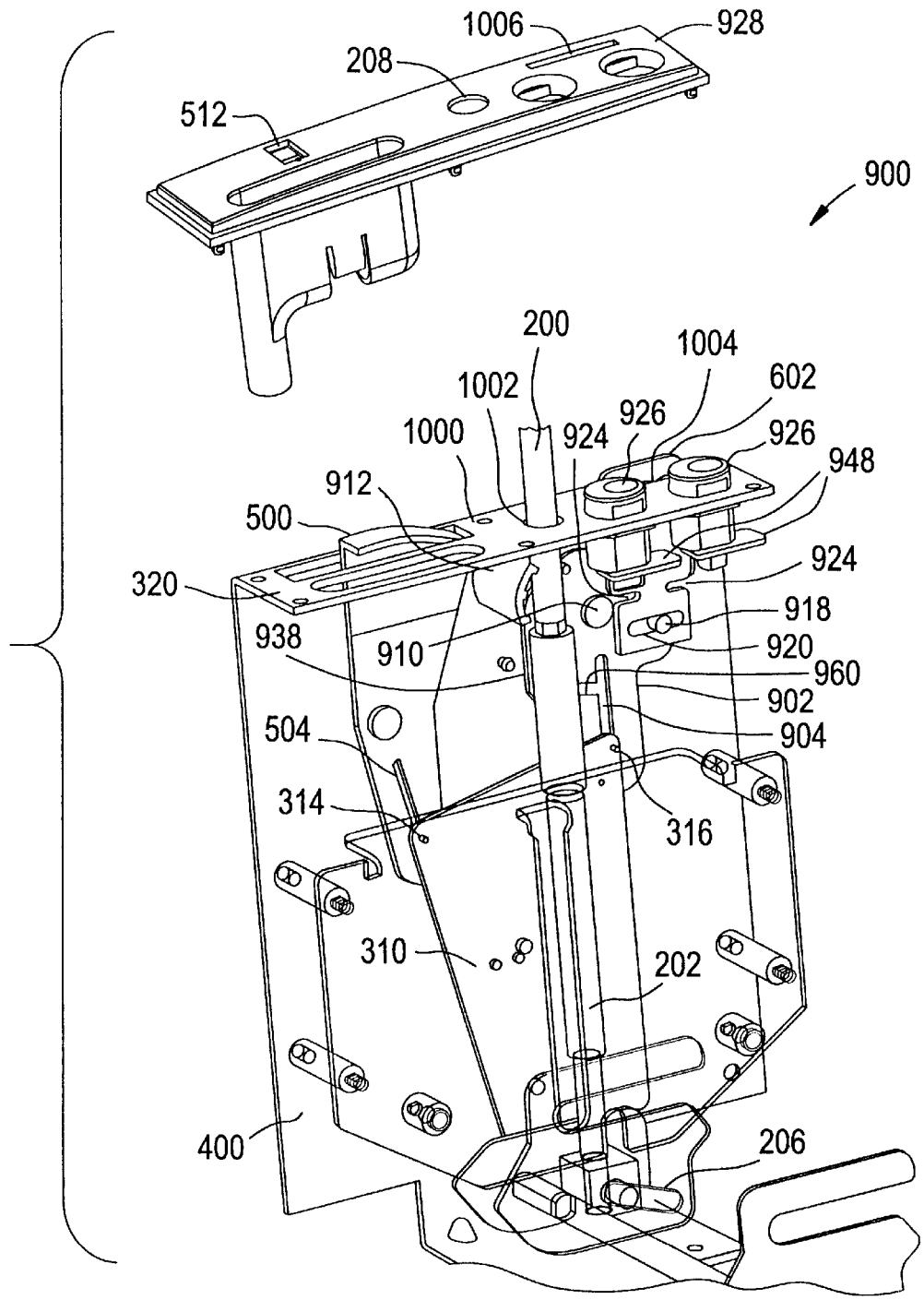
FIG. 11 is a perspective view of an alternative embodiment of a locking arrangement for the draw out mechanism.
Figure 12:
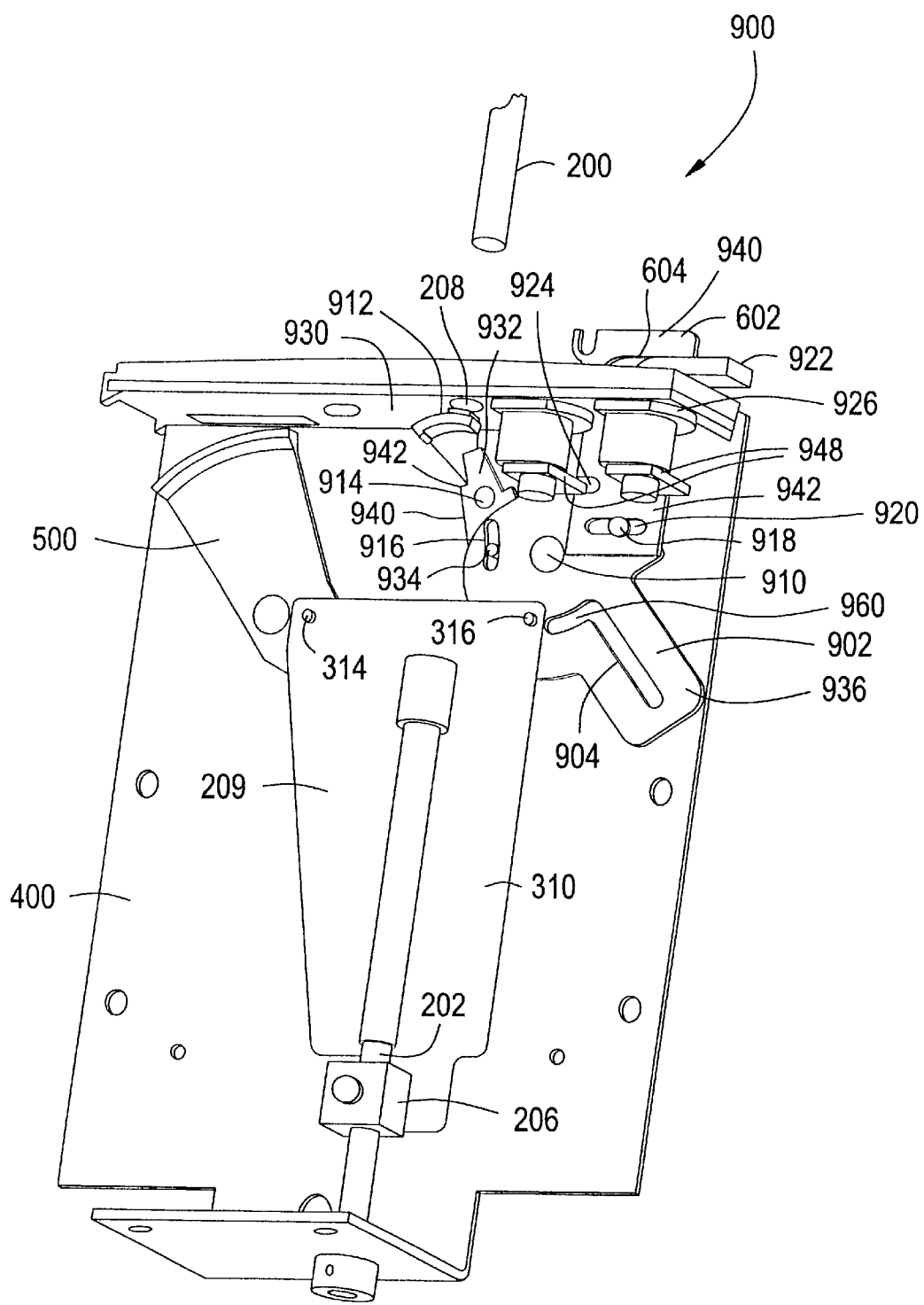
FIG. 12 is a perspective view of the locking arrangement of FIG. 11.

Referring to FIGS. 11 and 12, an alternative locking arrangement (device) for the draw out mechanism 100 (FIG. 1) is shown at 900. Like reference numerals refer to like parts of FIGS. I through 10. The components of the locking device 900 are mounted on the fixed side plate 400. The draw out mechanism consists of lead screw 202 and collar 206, which when rotated by means of crank 200 gives linear motion to the collar (rider) 206. The crank 200 extends from an opening 1002 located in surface 1000 of front piece 320. The opening 1002 is aligned with crank port 208 located on the front cover 928. The mobile side plate 310 is operatively engaged to the collar 206 and guided in the fixed side plate 400 such that the mobile side plate 310 moves linearly with the collar 206.

Figure 15:
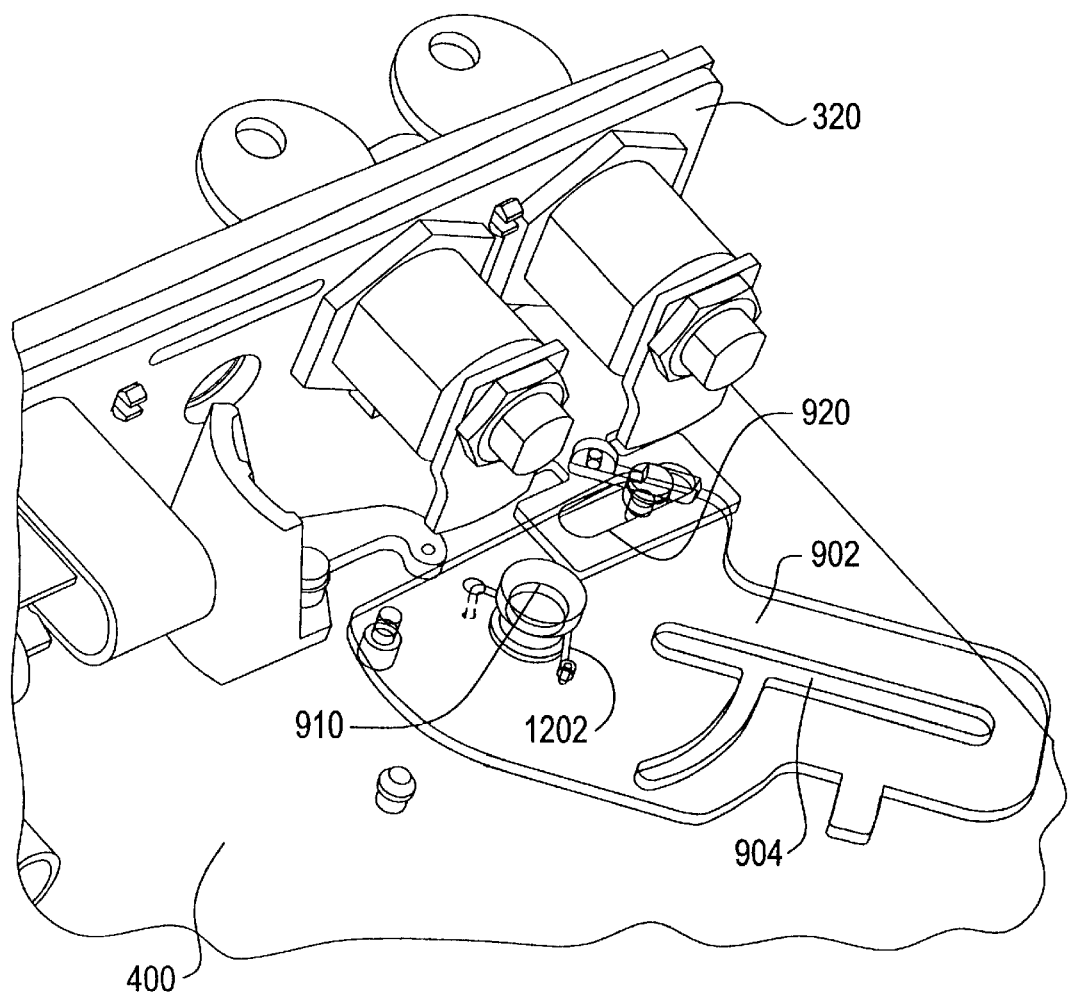
FIG. 15 is a partial enlarged perspective view of the obstructor plate showing a spring.

The obstructor plate 902 includes a slot (main slot) 904 and having a notch, preferably a circular slot, 960 extending out from the main slot 904. Circular slot 960 is in open communication with main slot 904 as shown in FIG. 11. This mobile side plate 310 is provided with two pins, 314 and 316. Pin 314 is used to rotate the position indicator 500 through the cam shaped slot 504 provided in the position indicator 500. The display of the position indicator 500 is seen through the indicator port 512 (FIG. 2) provided on a front cover 928 of the draw-out mechanism. The second pin 316 is engaged in the main slot 904 provided on a lock link (obstructor plate) 902, which is fixed to the fixed side plate 400 and is free to rotate about a rivet pin 910. The obstructor plate 902 is loaded with a spring 1202, preferably a torsion spring, the placement of which on the obstructor plate 902 is shown in FIG. 15. Spring 1202 provides rotating torque to the obstructor plate 902 in the counter-clockwise direction about rivet pin 910. The obstructor plate 902 has an outer surface 938 facing the fixed side plate 400 and an opposing inner surface 936 facing the interior of the draw-out mechanism 100 (FIG. 1). Spring 1202 is connected at one end to the obstructor plate 902 and at an opposing end to fixed side plate 400.

A blocking link (block link) 912 includes a main body portion 932 having an end 950 and an opposing end 952. A flange 930 extends from end 952. Blocking link 912 is riveted on the fixed side plate 400 and is free to rotate about the rivet pin 914. A projection (pin) 934 on the outer surface 938 of the obstructor plate 902 engages in a slot 916 provided on the main body portion 932 of the blocking link 912. Thus, the rotary motion (counter-clockwise) of obstructor plate 902 about rivet pin 910 is transferred to blocking link 912 such that the blocking link 912 rotates (clockwise) about rivet pin 914.

The locking slide (lock plate) 602 includes a first end 940 and a second end 942. The first end 940 of the locking slide 602 is provided with locking hole 604 for insertion of padlocks 922 and the second end 942 of the locking slide 602 includes a slot 920. A projection (pin) 918 on the inner surface 936 of the obstructor plate 902 engages slot 920 of the locking slide 602, as shown in FIG. 12. The rotation of the obstructor plate 902 gives linear motion to locking slide 602. Thus, the locking slide 602 is guided through a slot 1004 located on the front piece 320 and through a slot 1006 provided on the front cover 928. Slot 1004 and slot 1006 are aligned with each other. Further, slots 924 are also provided on locking slide 602 to engage tabs 948 extending from figure locks 926. It is noted that when the locking slide 602 projects out from the front cover 928, this provides an indication on the front cover 928 that the circuit breaker has reached the DISCONNECT position.

When the circuit breaker (not shown) is moved from the CONNECT (plug in) position to the DISCONNECT (isolated) position as shown in FIG. 12, it cannot be locked unless it fully reaches the DISCONNECT position because obstructor plate 902 is prevented from rotating by pin 316. Pin 316 cannot move into the circular slot 960.

When the circuit breaker has reached the DISCONNECT position, the obstructor plate 902 rotates under the bias of the spring 1202 (FIG. 15) such that pin 316 is fully engaged within the circular slot 960 of main slot 904, as shown in FIG. 12. The rotation of the obstructor plate 902 moves the locking slide 602 linearly and projects the locking hole 604 out through slot 1004 located on the surface 1000 of front piece 320 in order that a lock, preferably a padlock 922 can be fastened thereto. This action also provides an indication on the front cover 928 that the circuit breaker has reached the DISCONNECT position. Further, the rotation of the blocking link 912 causes the flange 930 to block access to the crank port 208.

To lock the circuit breaker, the crank 200 is removed from crank port 208. Removal of crank 200 from crank port 208 when the circuit breaker is fully in the DISCONNECT position frees the blocking link 912 and the obstructor plate 902 to rotate. The flange 930 of the blocking link 912 blocks access to the crank port 208. The locking slide 602 projects out of the front cover 928. The padlocks 922 can be inserted and the figure locks 926 can be operated with a key so that tabs 948 on the figure locks 926 engage the slots 924 in locking slide 602, thereby locking the circuit breaker in the DISCONNECT position and preventing tampering of the draw out mechanism 100 and the locking device 900.

Thus, locking arrangement 900 provides that once the crank 200 is withdrawn as shown in FIG. 12, permits the locking arrangement 900 to be locked and access to opening 1002 is blocked thereby preventing the crank 200 to operate the draw out mechanism 100 (FIG. 1). Further, the locking of the locking arrangement 900 can employ padlocks 922 or figure locks 926 or both as desired by the end user.

Figure 13:
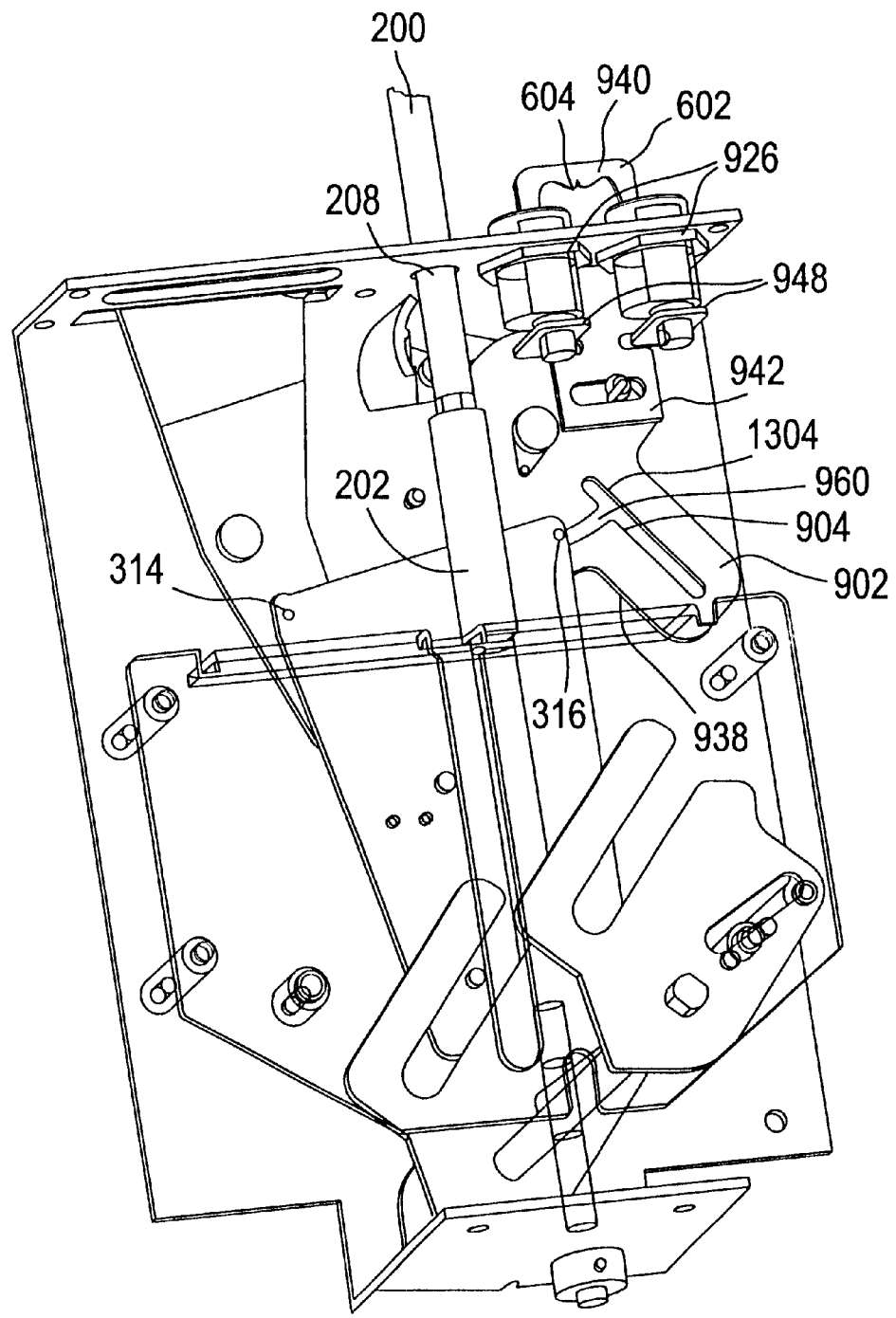
FIG. 13 is the locking arrangement of FIG. 11 in the locked position.
Figure 14:
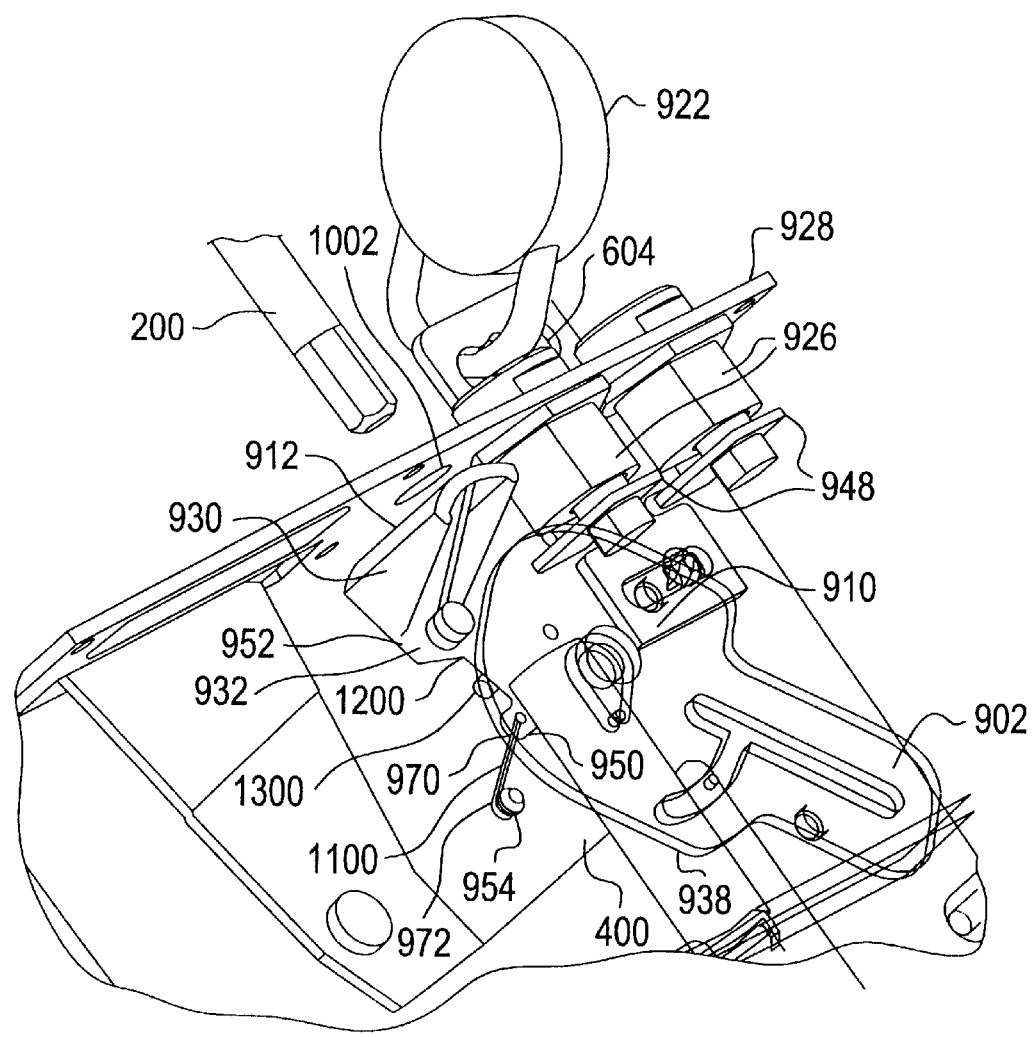
FIG. 14 is a perspective view of a second alternative embodiment of a locking arrangement for the draw out mechanism.

Referring to FIGS. 13 and 14, a second alternative embodiment is shown for the locking arrangement 900 where like reference numerals refer to like parts of FIGS. 1 through 12. Specifically, the features of the obstructor plate 902 and the blocking link 912 will be discussed in detail as it pertains to the second alternative embodiment for the locking arrangement 900.

In the second alternative embodiment, the blocking link 912 includes a main body portion 932 having an end 950 and an opposing end 952. A flange 930 extends from end 952. A spring, preferably an extension spring, 1100, is also shown. Spring 1100 includes a movable end 970 and a fixed end 972. The movable end 970 is attached to the end 950 of the blocking link 912 and the fixed end 972 is attached to a fixed pin 954 on the fixed side plate 400. Spring 1100 provides bias to the blocking link 912 in a first direction when the crank 200 is inserted within opening 1002 of the front cover 928.

It is noted that the blocking link 912 does not employ slot 916 as shown in the first alternative embodiment of FIGS. 11 and 12. Further, obstructor plate 902 does not employ pin 934 as shown in the first alternative embodiment of FIGS. 11 and 12.

In the second alternative embodiment, a projection 1300, preferably a pin riveted on the outer surface 938 of the obstructor plate 902, butts against a side 1200 of the main body portion 932 of the blocking link 912. A clockwise rotary motion of the obstructor plate 902 is transferred via projection 1300 to rotate the blocking link 912 in a counterclockwise direction. Thus, the rotation of the obstructor plate 902 is transferred to the blocking link 912.

The obstructor plate 902 includes a main slot 904 and, unlike the first alternative embodiment, also includes an extended portion (extended slot) 1304. Main slot 904 also includes a notch, preferably a circular slot, 960 extending out from the main slot 904 proximate to the extended portion 1304. Circular slot 960 and extended portion 1304 of main slot 904 are in open communication with main slot 904 as shown in FIG. 13.

The locking slide (lock plate), 602 is similar to that described hereinabove with reference to the first alternative embodiment. The locking slide (lock plate) 602 includes a first end 940 and a second end 942. The first end 940 of the locking slide 602 is provided with locking hole 604 for insertion of padlocks 922 and the second end 942 of the locking slide 602 includes a slot 920. A projection (pin) 918 on the inner surface 936 of the obstructor plate 902 engages slot 920 of the locking slide 602, as shown in FIG. 12. The rotation of the obstructor plate 902 gives linear motion to locking slide 602. Thus, the locking slide 602 is guided through a slot 1004 located on the front piece 320 and through a slot 1006 provided on the front cover 928. Slot 1004 and slot 1006 are aligned with each other. Further, slots 924 are also provided on locking slide 602 to engage tabs 948 extending from figure locks 926. It is noted that when the locking slide 602 projects out from the front cover 928, this provides an indication on the front cover 928 that the circuit breaker has reached the DISCONNECT position.

When the circuit breaker (not shown) is moved from the CONNECT (plug in) position to the DISCONNECT (isolated) position as shown in FIG. 12, it cannot be locked unless it fully reaches the DISCONNECT position because the obstructor plate 902 is prevented from rotating by pin 316. Pin 316 cannot move into the circular slot 960.

When the circuit breaker has reached the DISCONNECT position, the obstructor plate 902 rotates under the bias of spring 1202 (FIG. 15) such that pin 316 is fully engaged within the circular slot 960 of main slot 904, as shown in FIG. 12. It is noted that the spring 1202, as shown in FIG. 15, is employed in both the first and second alternative embodiments. The rotation of the obstructor plate 902 moves the locking slide 602 linearly and projects the locking hole 604 out through slot 1004 located on the surface 1000 of front piece 320 in order that a lock, preferably a padlock 922 can be fastened thereto. This action also provides an indication on the front cover 928 that the circuit breaker has reached the DISCONNECT position.

In the DISCONNECT position and unlike the first alternative embodiment, the blocking link 912 remains butted to the crank 200 due to the projection 1300 on the obstructor plate 902 that is pressing against the main body portion 932 of the blocking link 912. In this condition, the crank 200 can not be rotated as the pin 316 is now in the circular slot 960 of the main slot 904 and therefore pin 316 can not move linearly. However, since the locking hole 604 of the locking slide 602 is projected out through the front cover 928, the draw out mechanism 100 may be locked in the DISCONNECT position using the padlocks 922 with the crank 200 engaged in the crank port 208.

It is also noted that the crank 200 can be removed from crank port 208. When the crank 200 is withdrawn from crank port 208, the blocking link 912 under the urgence of the bias from spring 1 100, rotates clockwise thereby blocking access to crank port 208.

It is noted that the padlocks 922 can be inserted into locking hole 604 and the figure locks 926 can be operated with a key so that the tabs 948 on the figure locks 926 engage the slots 924 in the locking slide 602, thereby locking the circuit breaker in the DISCONNECT position and preventing tampering of the draw out mechanism 100 and the locking device 900.

Thus, depending on whether the crank 200 is removed from the crank port 208, the circuit breaker can be locked in the DISCONNECT position by any or all of the padlocks 922 and, additionally or alternatively, by any or all of the figure locks 926. If the circuit breaker is to be moved from the DISCONNECT position, it is necessary to remove all padlocks 922 and unlock all figure locks 926 that were selectively employed with the locking device 900. Once this is done, the locking slide 602 can be pressed back inside the front cover 928 which, in turn, rotates the blocking link 912 counter-clockwise. The counter clockwise rotation of the blocking link 912 in turn provides access to opening 1002 for insertion of crank 200. When the locking slide 602 is pressed inside the front cover 924, the pin 316 engages the main slot 904 from the end of the circular slot 960 such that the locking slide 602 is free to move to the extended slot 1304 or the main slot 904. Then, the crank 200 can be inserted into crank port 208 to engage with collar 206. Thus, the draw out mechanism 100 can be moved to the CONNECT or TEST positions. For motion towards the CONNECT position, pin 316 will travel in the main slot 904 while for motion towards the TEST position, pin 316 will engage the extended portion 1304. This is accomplished as follows. To go from the DISCONNECT to the CONNECT position, the locking slide 602 is pressed against the front cover 928. The crank 200 is inserted into the crank port 208 and then rotated keeping the locking slide 602 pressed against the, front cover 928 till the crank 200 completes one rotation. This motion guides the pin 316 into the main slot 904. Then, the end user may release the pressure applied to the locking slide 602 and rotate the crank 200 clockwise in order that the pin 316 will reach the CONNECT position. To go from the DISCONNECT to the TEST position, the same procedure above is followed except that once pin 316 is guided into the main slot 904, the crank 200 is rotated counterclockwise in order that the pin 316 will reach the TEST position.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A locking arrangement suitable for use with a draw-out mechanism mounted on a circuit breaker within a switchgear cabinet, the locking arrangement comprising:
    a fixed side plate arranged for mounting within switchgear cabinet;
    a mobile side plate, said mobile side plate includes a first pin extending therefrom, said mobile side plate arranged to move the circuit breaker in cooperation therewith;
    an obstructor plate pivotally mounted to said fixed sideplate, said obstructor plate having a slot and a notch extending from said slot, said first pin traverses said slot to allow said mobile side plate to move relative to said fixed side plate;
    wherein rotation of said obstructor plate positions said first pin in said notch to prevent said movable side plate from moving relative to said fixed side plate.

2. The locking arrangement of claim I further comprising:
    a locking slide slidably engaged to said fixed side plate and pivotally attached to said obstructor plate, said locking slide having a locking hole disposed therein, said locking hole arranged to accept a lock to prevent movement of said mobile side plate relative to said fixed side plate.

3. The locking arrangement of claim 2 wherein said locking slide includes a first end and a second end, said locking hole disposed on said first end and a first slot located at said second end and said obstructor plate includes a pin slidably received within said first slot of said locking slide;
    wherein said locking slide moves linearly upon rotation of said obstructor plate as said pin of said obstructor plate traverses said first slot of said locking slide.

4. The locking arrangement of claim 3 wherein said locking slide includes a second slot positioned between said first end and said second end, said second slot configured to receive a tab extending from a figure lock, said figure lock to prevent movement of said mobile side plate relative to said fixed side plate.

5. The locking arrangement of claim 2 further comprising:
    a block link having a main body portion and a flange extending outwardly therefrom, said block link pivotally mounted to said fixed sideplate, said block link configured for cooperation with said obstructor plate.

6. The locking arrangement of claim 5 wherein said main body portion of said block link includes a slot and said obstructor plate includes a pin extending within said slot of said block link, said pin of said obstructor plate traverses said slot of said block link for rotational movement of said block link upon rotation of said obstructor plate.

7. The locking arrangement of claim 5 wherein said obstructor plate includes a pin, said pin of said obstructor plate engages said block link upon rotation of said obstructor plate to prevent rotation of said block link.

8. The locking arrangement of claim 7 wherein said block link rotates upon removal of a crank from an access hole of the draw out mechanism, said flange of said block link covers the access hole.

9. The locking arrangement of claim 7 wherein said slot of said obstructor plate includes an extended portion;
    wherein said first pin of said mobile side plate traverses said extended portion when the circuit breaker is in a TEST position.

10. The locking arrangement of claim 7 further including a spring having a fixed end and a movable end, said movable end attached to said main body portion of said block link for biasing said block link in a first direction.

11. The locking arrangement of claim 1 wherein said obstructor plate is biased in a first direction for engaging said first pin of said mobile side plate within said notch.

12. The locking arrangement of claim 1 wherein said first pin of said mobile side plate traverses said notch upon rotation of a crank of the draw out mechanism to disconnect the circuit breaker from the draw out mechanism.

13. The locking arrangement of claim 1 wherein said notch is a circular slot.

14. The locking arrangement of claim 1 further including a spring attached at one end to said obstructor plate and at an opposing end to said fixed side plate and said obstructor plate includes a pin, said obstructor plate biased in a first direction about said pin by said spring.

15. The locking arrangement of claim 1 wherein said obstructor plate is operatively connected to a flange and a block link rotates upon removal of a crank from an access hole of the draw out mechanism, and wherein said flange covers the access hole.

16. The locking arrangement of claim 1, further including:
    an indicator pivotally mounted to said fixed sideplate, said indicator including a slot;
    said mobile side plate including a second pin extending therefrom, said second pin of said mobile side plate extending within said slot of said indicator for pivoting said indicator upon movement of said mobile side plate.

17. The locking arrangement of claim 16, wherein said indicator indicates a position of the circuit breaker;
    wherein said position is CONNECT, DISCONNECT, or RESET.

18. The locking arrangement of claim 17 wherein said indicator includes graphics representative of said CONNECT, DISCONNECT, and RESET positions, one of said graphics being visible external to the draw out mechanism.

19. A draw-out mechanism for mounting a circuit breaker within a switchgear cabinet, the draw-out mechanism comprising:
    a cover having an access hole;
    a fixed side plate arranged for mounting within the switchgear cabinet;
    a mobile side plate, said mobile side plate includes a first pin extending therefrom, said mobile side plate arranged to move the circuit breaker in cooperation therewith;
    a crank slidably connected to said mobile side plate, said crank protrudes from said access hole;
    an obstructor plate pivotally mounted to said fixed sideplate, said obstructor plate having a slot and a notch extending from said slot, said first pin traversing said slot to allow said mobile side plate to move relative to said fixed side plate;

wherein rotation of said crank rotates said obstructor plate and positions said first pin in said notch to prevent said movable side plate from moving relative to said fixed side plate.

20. The draw out mechanism of claim 19 further comprising:

a locking slide slidably engaged to said fixed side plate and pivotally attached to said obstructor plate, said locking slide having a locking hole disposed therein, said locking hole arranged to accept a lock to prevent movement of said mobile side plate relative to said fixed side plate.

21. The draw out mechanism of claim 20 wherein said cover includes a slot and said locking slide includes a first end and a second end, said locking hole disposed on said first end and a first slot located at said second end and said obstructor plate includes a pin slidably received within said first slot of said locking slide;

wherein said locking slide moves linearly upon rotation of said obstructor plate as said pin of said obstructor plate traverses said first slot of said locking slide, said locking hole projects from said slot of said cover.

22. The draw out mechanism of claim 21 wherein said locking slide includes a second slot positioned between said first end and said second end, said second slot configured to receive a tab extending from a figure lock, said figure lock to prevent movement of said mobile side plate relative to said fixed side plate.

23. The draw out mechanism of claim 20 further comprising:

a block link having a main body portion and a flange extending outwardly therefrom, said block link pivotally mounted to said fixed sideplate, said block link configured for cooperation with said obstructor plate;

wherein rotation of said obstructor plate rotates said block link, said flange covers said access hole.

24. The draw out mechanism of claim 23 wherein said main body portion of said block link includes a slot and said obstructor plate includes a pin extending within said slot of said block link, said pin of said obstructor plate traverses said slot of said block link for rotational movement of said block link upon rotation of said obstructor plate.

25. The draw out mechanism of claim 23 wherein said obstructor plate includes a pin, said pin of said obstructor plate engages said block link upon rotation of said obstructor plate to prevent rotation of said block link.

26. The draw out mechanism of claim 25 wherein said block link rotates upon removal of said crank from said access hole, said flange of said block link covers said access hole.

27. The draw out mechanism of claim 25 wherein said slot of said obstructor plate includes an extended portion;

wherein said first pin of said mobile side plate traverses said extended portion when the circuit breaker is in a TEST position.

28. The draw-out mechanism of claim 25 further including a spring having a fixed end and a movable end, said movable end attached to said main body portion of said block link for biasing said block link in a first direction when said crank is slidably inserted within said access hole and biasing said block link in a second direction when said crank is removed from said access hole;

wherein said flange of said block link covers said access hole when biased in the second direction.

29. The draw out mechanism of claim 19 wherein said obstructor plate is biased in a first direction for engaging said first pin of said mobile side plate within said notch.

30. The draw out mechanism of claim 19 wherein said first pin of said mobile side plate traverses said notch upon rotation of said crank to disconnect the circuit breaker from the draw out mechanism.

31. The draw out mechanism of claim 19 wherein said notch is a circular slot.

32. The draw out mechanism of claim 19 further including a spring attached at one end to said obstructor plate and at an opposing end to said fixed side plate and said obstructor plate includes a pin, said obstructor plate biased in a first direction about said pin by said spring.

33. The draw out mechanism of claim 19 wherein said obstructor plate is operatively connected to a flange and said block link rotates upon removal of said crank from said access hole, and wherein said flange covers said access hole.

34. The draw out mechanism of claim 19, further including:

an indicator pivotally mounted to said fixed sideplate, said indicator including a slot;

said mobile side plate including a second pin extending therefrom, said second pin of said mobile side plate extending within said slot of said indicator for pivoting said indicator upon movement of said mobile side plate.

35. The draw out mechanism of claim 34, wherein said indicator indicates a position of the circuit breaker;

wherein said position is CONNECT, DISCONNECT, or RESET.

36. The draw out mechanism of claim 35, wherein said indicator includes graphics representative of said CONNECT, DISCONNECT, and RESET positions, one of said graphics being visible through a port.

* * * * *